(12) United States Patent
Park et al.

(10) Patent No.: US 10,925,079 B2
(45) Date of Patent: Feb. 16, 2021

(54) METHOD AND DEVICE FOR SCHEDULING UPLINK SIGNAL AND DOWNLINK DATA CHANNEL IN NEXT GENERATION WIRELESS NETWORK

(71) Applicant: KT CORPORATION, Gyeonggi-do (KR)

(72) Inventors: Kyujin Park, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 78 days.

(21) Appl. No.: 16/340,460

(22) PCT Filed: Oct. 27, 2017

(86) PCT No.: PCT/KR2017/011968
§ 371 (c)(1),
(2) Date: Apr. 9, 2019

(87) PCT Pub. No.: WO2018/080217
PCT Pub. Date: May 3, 2018

(65) Prior Publication Data
US 2020/0128578 A1   Apr. 23, 2020

(30) Foreign Application Priority Data

Oct. 27, 2016   (KR) .................. 10-2016-0141451
Mar. 24, 2017   (KR) .................. 10-2017-0037553
(Continued)

(51) Int. Cl.
*H04W 72/12*   (2009.01)
*H04L 1/18*   (2006.01)
(Continued)

(52) U.S. Cl.
CPC ....... *H04W 72/1278* (2013.01); *H04L 1/1812* (2013.01); *H04L 5/0055* (2013.01); *H04W 72/0446* (2013.01)

(58) Field of Classification Search
CPC ....... H04L 1/1812; H04L 5/00; H04L 5/0055; H04W 72/0446; H04W 72/1268; H04W 72/1273; H04W 72/1278; H04W 72/1289
See application file for complete search history.

(56) References Cited

U.S. PATENT DOCUMENTS 8,879,479 B2   11/2014   Baker et al.
9,608,775 B2   3/2017   Kim et al.
(Continued)

FOREIGN PATENT DOCUMENTS

| KR | 10-2015-0035291 A | 4/2015 |
| WO | 2015/169397 A1 | 11/2015 |
| WO | 2016/137532 A1 | 9/2016 |

OTHER PUBLICATIONS

Huawei et al., "Discussion on slot and mini-slot", R1-1608837, 3GPP TSG RAN WG1 Meeting #86bis, Lisbon, Portugal, Oct. 10-14, 2016, pp. 1-4.
(Continued)

*Primary Examiner* — Khaled M Kassim
(74) *Attorney, Agent, or Firm* — IP Legal Services, LLC

(57) ABSTRACT

The present embodiments provide a method for scheduling an uplink signal and a downlink data channel in an NR, wherein one embodiment is a method by which a terminal schedules an uplink signal and a downlink data channel, the method comprising the steps of: receiving, from a base station, an uplink signal and downlink data channel scheduling information; and scheduling the uplink signal and the downlink data channel on the basis of the scheduling information. Therein: the scheduling information comprises timing relationship setting information between a downlink
(Continued)

control channel and a corresponding downlink data channel or uplink data channel, and timing relationship setting information of a downlink data channel and a corresponding uplink control channel; and the numerology of the downlink control channel and the numerology of the corresponding downlink data channel or uplink data channel are different, or, the numerology of the downlink data channel and the numerology of the corresponding uplink control channel are different.

12 Claims, 8 Drawing Sheets

(30) Foreign Application Priority Data

| Jun. 23, 2017 | (KR) | 10-2017-0079911 |
|---|---|---|
| Oct. 11, 2017 | (KR) | 10-2017-0130023 |
| Oct. 26, 2017 | (KR) | 10-2017-0139885 |

(51) Int. Cl.
*H04L 5/00* (2006.01)
*H04W 72/04* (2009.01)

(56) References Cited

U.S. PATENT DOCUMENTS

| 10,820,300 | B2 | 10/2020 | Noh et al. | |
|---|---|---|---|---|
| 2004/0160936 | A1 | 8/2004 | Liu et al. | |
| 2014/0204854 | A1* | 7/2014 | Freda | H04W 72/042 |
| | | | | 370/329 |
| 2015/0092632 | A1 | 4/2015 | Park | |
| 2015/0249980 | A1 | 9/2015 | You et al. | |
| 2016/0211951 | A1 | 7/2016 | Park | |
| 2017/0055181 | A1 | 2/2017 | Tiirola et al. | |
| 2017/0085346 | A1 | 3/2017 | Tiirola et al. | |
| 2017/0164361 | A1 | 6/2017 | Park | |
| 2018/0020462 | A1 | 1/2018 | Xiong et al. | |
| 2018/0098312 | A1* | 4/2018 | Lin | H04L 1/1861 |
| 2018/0152954 | A1* | 5/2018 | Golitschek Edler Von Elbwart | H04L 5/001 |
| 2018/0219654 | A1 | 8/2018 | Chen et al. | |
| 2019/0053232 | A1 | 2/2019 | Park | |
| 2019/0074935 | A1 | 3/2019 | Babaei et al. | |
| 2019/0090218 | A1* | 3/2019 | Noh | H04W 72/005 |
| 2019/0090225 | A1* | 3/2019 | Tang | H04L 5/0007 |
| 2019/0208482 | A1* | 7/2019 | Tooher | H04L 27/2628 |
| 2020/0029307 | A1* | 1/2020 | Takeda | H04W 72/042 |
| 2020/0045684 | A1* | 2/2020 | Futaki | H04W 72/048 |
| 2020/0128578 | A1* | 4/2020 | Park | H04W 72/1289 |
| 2020/0274646 | A1* | 8/2020 | Du | H04W 72/1278 |

OTHER PUBLICATIONS

Zte et al., "On Indicating HARQ and PUCCH", R1-1608958, 3GPP TSG-RAN WG1 Meeting #86bis, Lisbon, Portugal, Oct. 10-14, 2016, pp. 1-3.
LG Electronics, "Remaining details on supplementary UL in NR LTE coexistence", R1-1713221, 3GPP TSG RAN WG1 Meeting #90, Prague, Czech Republic, Aug. 21-25, 2017, pp. 1-4.
Huawei, "Email discussion [87-24] on sTTI scheduling", R1-17xxxxx, 3GPP TSG RAN WG1 Meeting #88, Athens, Greece, Feb. 13-17, 2017, pp. 1-14.
Ericsson, "Summary of e-mail discussions on downlink control signaling", R1-1701036, TSG-RAN WG1 NR AdHoc, Spokane, WA, USA, Jan. 16-20, 2017, pp. 1-18.
LG Electronics, "Discussion on potential HARQ operation in NR", R1-1609283, 3GPP TSG RAN WG1 meeting #86bis, Lisbon, Portugal, Oct. 10-14, 2016.
Huawei et al., "Way Forward on NR Carrier Aggregation", R1-1711846, 3GPP TSG RAN WG1 NR Ad-Hoc Meeting, Qingdao, China, Jun. 27-30, 2017.
European Patent Office, European Search Report of corresponding EP Patent Application No. 17865212.9, dated Apr. 8, 2020.
Samsung, "Support of Flexible Scheduling Timing", R1-1609133, 3GPP TSG RAN WG1 #86bis, Lisbon, Portugal, Oct. 10-14, 2016, pp. 1-4.
Zte et al., "About Slot structure and Scheduling Units for NR", R1-1608964, 3GPP TSG RAN WG1 Meeting #86bis, Lisbon, Portugal, Oct. 10-14, 2016, pp. 1-8.
CATT, "NR DL control channel design considerations", R1-1608791, 3GPP TSG RAN WG1 #86bis, Lisbon, Portugal Oct. 10-14, 2016, pp. 1-5.
Samsung, "Carrier Aggregation for NR", R1-1609138, 3GPP TSG RAN WG1 #86bis, Lisbon, Portugal, Oct. 10-14, 2016, pp. 1-3.
European Patent Office, European Search Report of corresponding EP Patent Application No. 17865477.8, dated Apr. 16, 2020.

* cited by examiner

METHOD AND DEVICE FOR SCHEDULING UPLINK SIGNAL AND DOWNLINK DATA CHANNEL IN NEXT GENERATION WIRELESS NETWORK

CROSS REFERENCE TO RELATED APPLICATIONS

This application is a National Stage Patent Application of PCT International Patent Application No. PCT/KR2017/011968 (filed on Oct. 27, 2017) under 35 U.S.C. § 371, which claims priority to Korean Patent Application Nos. 10-2016-0141451 (filed on Oct. 27, 2016), 10-2017-0037553 (filed on Mar. 24, 2017), 10-2017-0079911 (filed on Jun. 23, 2017), 10-2017-0130023 (filed on Oct. 11, 2017), and 10-2017-0139885 (filed on Oct. 26, 2017), the teachings of which are incorporated herein in their entireties by reference.

TECHNICAL FIELD

The present disclosure relates to methods of scheduling an uplink signal and a downlink data channel in a next-generation/5G radio access network (hereinafter, referred to as "NR" or "New Radio") that is under discussion in the 3rd generation partnership project (3GPP).

BACKGROUND ART

Recently, the 3GPP has approved the "Study on New Radio Access Technology", which is a study item for research on next-generation/5G radio access technology. On the basis of the Study on New Radio Access Technology, Radio Access Network Working Group 1 (RAN WG1) has been discussing frame structures, channel coding and modulation, waveforms, multiple access methods, and the like for the new radio (NR). It is required to design the NR not only to provide an improved data transmission rate as compared with the long term evolution (LTE)/LTE-Advanced, but also to meet various requirements in detailed and specific usage scenarios.

In particular, an enhanced mobile broadband (eMBB), massive machine-type communication (mMTC), and ultra-reliable and low latency communication (URLLC) are proposed as representative usage scenarios of the NR. In order to meet the requirements of the individual scenarios, it is required to design the NR to have flexible frame structures, compared with the LTE/LTE-Advanced.

Meanwhile, in order to support various scenarios, the NR supports a frame structure supporting a plurality of numerologies with subcarrier spacing (SCS) values different from one another and further supports scheduling time intervals different from one another.

As a result, in the NR, in the case of defining a timing relationship between downlink control information (DCI) and corresponding downlink/uplink data and a timing relationship between downlink data reception and corresponding HARQ ACK/NACK feedback, an ambiguity problem may occur because it is unclear which numerology a timing relationship between a user equipment and a base station should be defined based on.

DETAILED DESCRIPTION OF THE INVENTION

Technical Problem

It is an object of the present disclosure to provide methods of configuring scheduling information for scheduling an uplink signal and a downlink data channel, and scheduling the uplink signal and the downlink data channel by a user equipment based on the configured scheduling information, in case a plurality of numerologies is supported in an NR system.

Technical Solution

To address the issues, in accordance with an aspect of the present disclosure, a method of a user equipment is provided for scheduling an uplink signal and a downlink data channel. The method includes: receiving scheduling information on the uplink signal and the downlink data channel from a base station through a downlink control channel, and scheduling the uplink signal and the downlink data channel based on the scheduling information. The scheduling information includes timing relationship configuration information between the downlink control channel and at least one of the downlink data channel or an uplink data channel for the downlink control channel, and timing relationship configuration information between the downlink data channel and an uplink control channel for the downlink data channel. A numerology of a carrier for receiving the downlink control channel may be different from a numerology of at least one of the downlink data channel or the uplink data channel for the downlink control channel, or a numerology of a carrier for receiving the downlink data channel may be different from a numerology of the uplink control channel for the downlink data channel.

In accordance with another aspect of the present disclosure, a method of a base station is provided for scheduling an uplink signal and a downlink data channel. The method includes: configuring scheduling information for scheduling the uplink signal and the downlink data channel, and transmitting the scheduling information on the uplink signal and the downlink data channel to a user equipment through a downlink control channel. The scheduling information includes timing relationship configuration information between the downlink control channel and at least one of the downlink data channel or an uplink data channel for the downlink control channel, and timing relationship configuration information between the downlink data channel and an uplink control channel for the downlink data channel. A numerology of a carrier for receiving the downlink control channel may be different from a numerology of at least one of the downlink data channel or the uplink data channel for the downlink control channel, or a numerology of a carrier for receiving the downlink data channel may be different from a numerology of the uplink control channel for the downlink data channel.

In accordance with further another aspect of the present disclosure, a user equipment is provided for scheduling an uplink signal and a downlink data channel. The user equipment includes: a receiver configured to receive scheduling information on the uplink signal and the downlink data channel from a base station through a downlink control channel, and a controller configured to schedule the uplink signal and the downlink data channel based on the scheduling information. The scheduling information includes timing relationship configuration information between the downlink control channel and at least one of the downlink data channel or an uplink data channel for the downlink control channel, and timing relationship configuration information between the downlink data channel and an uplink control channel for the downlink data channel. A numerology of a carrier for receiving the downlink control channel may be different from a numerology of at least one of the downlink data channel or the uplink data channel for the downlink control channel, or a numerology of a carrier for receiving the downlink data channel may be different from a numerology of the uplink control channel for the downlink data channel.

In accordance with yet another aspect of the present disclosure, a base station is provided for scheduling an uplink signal and a downlink data channel. The base station includes: a controller configured to configure scheduling information for scheduling the uplink signal and the downlink data channel, and a transmitter configured to transmit the scheduling information on the uplink signal and the downlink data channel to a user equipment through a downlink control channel. The scheduling information includes timing relationship configuration information between the downlink control channel and at least one of the downlink data channel or an uplink data channel for the downlink control channel, and timing relationship configuration information between the downlink data channel and an uplink control channel for the downlink data channel. A numerology of a carrier for receiving the downlink control channel may be different from a numerology of at least one of the downlink data channel or the uplink data channel for the downlink control channel, or a numerology of a carrier for receiving the downlink data channel may be different from a numerology of the uplink control channel for the downlink data channel.

Effects of the Invention

In accordance with some embodiments of the present disclosure, a method is provided for configuring scheduling information for scheduling an uplink signal and a downlink data channel and scheduling the uplink signal and the downlink data channel by a user equipment base on the configured information, in case a plurality of numerologies are supported in an NR system.

BEST MODE FOR CARRYING OUT THE INVENTION

Figure 1:
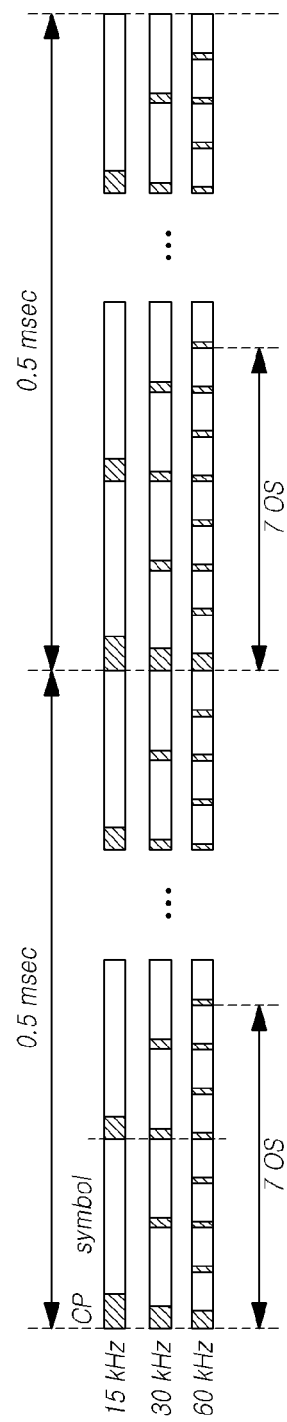
FIG. 1 is a diagram illustrating arrangements of orthogonal frequency division multiple (OFDM) symbols in case of using different subcarrier spacings according to embodiments of the present disclosure.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present disclosure, a wireless communication system refers to a system for providing various communication services such as a voice communication service, a packet data service, etc. The wireless communication system includes user equipment (UE) and a base station (BS).

The UE is a generic term referring to devices used in wireless communication. For example, the UE may be referred to, but not limited to, a UE supporting wideband code division multiple access (WCDMA), long term evolution (LTE), high speed packet access (HSPA), international mobile telecommunications (IMT)-2020 (5G or new radio), or the like, a mobile station (MS) supporting the global system for mobile communication (GSM), a user terminal (UT), a subscriber station (SS), a wireless device, or the like.

The base station or a cell generally refers to a station communicating with the UE. The base station or the cell is a generic term referring to, but not limited to, all of various communication service areas and devices, such as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), and a small cell.

Each of the various cells is controlled by a base station. Therefore, the base station may be classified into two categories. 1) The base station may be referred to an apparatus that forms and provides a corresponding communication service area, such as a megacell, a macrocell, a microcell, a picocell, a femtocell, and a small cell, or 2) the base station may be referred to a communication service area. In the case of 1), the base station may be referred to i) apparatuses that form and provide any corresponding communication service area, and are controlled by the same entity, or ii) apparatus that interact and cooperate with each other for forming and providing the corresponding communication service area. According to communication schemes employed by a base station, the base station may be referred to as a point, a transmission/reception point, a transmission point, a reception point, or the like. In case of 2), the base station may be a communication service area itself where UEs able to receive signals from or transmit signals to other UEs and neighboring base stations.

In the present disclosure, the cell may also refer to a coverage of a signal transmitted from a transmission/reception point, a component carrier having the coverage of a signal transmitted from a transmission point or a transmission/reception point, or a transmission/reception point itself.

The UE and the base station are two entities for performing transmission/reception used to embody the technology and technical spirit described in the present specification. The UE and the base station are a generic term and not limited to specific terms or words.

Herein, the uplink (UL) refers to data transmission/reception by a UE to/from a base station, and the downlink (DL) refers to data transmission/reception by a base station to/from a UE.

UL transmission and DL transmission may be performed by employing i) a time division duplex (TDD) technique performing transmission through different time slots, ii) a frequency division duplex (FDD) technique performing transmission through different frequencies, or ii) a hybrid technique of the frequency division duplex (FDD) and the time division duplex (TDD).

Further, the related standard of the wireless communication system defines configuring the UL and the DL based on a single carrier or a pair of carriers.

The UL and the DL transmit control information through one or more control channels, such as a physical DL control channel (PDCCH), a physical UL control channel (PUCCH), and the like. The UL and DL transmit data through data channels, such as a physical DL shared channel (PDSCH), a physical UL shared channel (PUSCH), and the like.

The DL may denote communication or a communication path from multiple transmission/reception points to a UE, and the UL may denote communication or a communication path from the UE to the multiple transmission/reception points. In the DL, a transmitter may be a part of multiple transmission/reception points, and a receiver may be a part of a UE. In the UL, a transmitter may be a part of a UE and a receiver may be a part of multiple transmission/reception points.

Hereinafter, transmission and reception of a signal through the PUCCH, the PUSCH, the PDCCH, or the PDSCH, may be described as the transmission and reception of the PUCCH, the PUSCH, the PDCCH, or the PDSCH.

Meanwhile, higher layer signaling includes radio resource control (RRC) signaling transmitting RRC information containing an RRC parameter.

The base station performs DL transmission to UEs. The base station may transmit a physical DL control channel for transmitting i) DL control information, such as scheduling required to receive a DL data channel that is a primary physical channel for unicast transmission, and ii) scheduling approval information for transmission through an UL data channel. Hereinafter, transmitting/receiving a signal through each channel may be described in such a manner that a corresponding channel is transmitted/received.

Any of multiple access techniques may be applied to the wireless communication system, and therefore no limitation is imposed on them. For example, the wireless communication system may employ various multiple access techniques, such as time division multiple access (TDMA), frequency division multiple access (FDMA), CDMA, orthogonal frequency division multiple access (OFDMA), non-orthogonal multiple access (NOMA), OFDM-TDMA, OFDM-FDMA, OFDM-CDMA, or the like. The NOMA includes sparse code multiple access (SCMA), low cost spreading (LDS), and the like.

Embodiments of the present disclosure may be applied to resource allocation in i) asynchronous wireless communication evolving into LTE/LTE-advanced and IMT-2020 from GSM, WCDMA, and HSPA, ii) synchronous wireless communication evolving into CDMA, CDMA-2000, and UMB.

In the present disclosure, a machine type communication (MTC) terminal may refer to a terminal supporting low costs (or low complexity), a terminal supporting coverage enhancement, or the like. As another example, the MTC terminal may refer to a terminal defined as a predetermined category for supporting low cost (or low complexity) and/or coverage enhancement.

In other words, the MTC terminal may refer to a low cost (or low complexity) UE category/type newly defined in 3GPP Release-13 and performing LTE-based MTC-related operations. The MTC terminal may refer to a UE category/type defined in or before 3GPP Release-12, which supports enhanced coverage in comparison with the typical LTE coverage or supports low power consumption. Or, the MTC device may refer to a low cost (or low complexity) UE category/type newly defined in Release-13. The MTC terminal may refer to a further enhanced MTC terminal defined in Release-14.

In the present disclosure, a narrowband Internet of Things (NB-IoT) terminal refers to a terminal supporting radio access for cellular IoT. NB-IoT technology aims at improved indoor coverage, support for large-scale low-speed terminals, low latency sensitivity, very low terminal costs, low power consumption, and optimized network architecture.

An enhanced mobile broadband (eMBB), massive machine-type communication (mMTC), and ultra-reliable and low latency communication (URLLC) are proposed as representative usage scenarios for NR having been discussed in the 3GPP recently.

In the present disclosure, a frequency, a frame, a sub-frame, a resource, a resource block (RB), a region, a band, a sub-band, a control channel, a data channel, a synchronization signal, various reference signals, various signals, and various messages, associated with NR may be interpreted as meanings that were used in the past or are used in the present or as various meanings that will be used in the future.

NR (New Radio)

Recently, the 3GPP has approved the "Study on New Radio Access Technology", which is a study item for research on next-generation/5G radio access technology. On the basis of the Study on New Radio Access Technology, discussions have been in progress for frame structures, channel coding and modulation, waveforms, multiple access methods, and the like for the new radio (NR).

It is required to design the NR not only to provide improved data transmission rates compared with the long term evolution (LTE)/LTE-Advanced, but also to meet various requirements in detailed and specific usage scenarios. In particular, an enhanced mobile broadband (eMBB), massive machine-type communication (mMTC), and ultra-reliable and low latency communication (URLLC) are proposed as representative usage scenarios of the NR. In order to meet the requirements of the individual scenarios, it is required to design the NR to have a flexible frame structure compared with the LTE/LTE-Advanced.

Since each usage scenario imposes different requirements for data rates, latency, coverage, etc., there arises a need for a method for efficiently multiplexing numerology-based (e.g., a subcarrier spacing (SCS), a subframe, a transmission time interval (TTI), etc.) radio resource units each different from another, as a method for efficiently satisfying requirements for each usage scenario through a frequency band used by an arbitrary NR system.

To this end, discussions have been conducted for developing i) techniques for supporting the requirements by multiplexing at least one numerology having subcarrier spacing (SCS) values each different from another based on TDM, FDM or TDM/FDM, through one NR carrier, and ii) techniques for supporting one or more time units in configuring a scheduling unit in the time domain. In this regard, in the NR, a subframe has been defined as one type of a time domain structure, and as a reference numerology to define a corresponding subframe duration, a single subframe duration has been defined as being made up of 14 OFDM symbols of normal CP overhead based on 15 kHz subcarrier spacing (SCS) identical to that of the LTE. Therefore, the subframe of the NR has a time duration of 1 ms. Unlike the LTE, since the subframe of the NR is an absolute reference time duration, a slot and a mini-slot may be defined as a time unit for actual UL/DL data scheduling. In this case, the number of OFDM symbols forming a slot, a value of y, has been defined as y=14, regardless of a numerology.

Therefore, a slot may be formed of 14 symbols. In addition, according to transmission direction for the slot, all symbols may be used for DL transmission or UL transmission, or the symbols may be used in the configuration of a DL portion+a gap+an UL portion.

Further, a mini-slot formed of fewer symbols than the slot has been defined in a numerology (or SCS). As a result, based on the mini-slot, a time-domain scheduling interval with a short length may be set for UL/DL data transmission/reception, or a time-domain scheduling interval with a long length may be configured for UL/DL data transmission/reception by slot aggregation.

Particularly, in case latency critical data are transmitted/received, as in the URLLC, it may be difficult to satisfy a latency requirement when scheduling is performed based on a unit of a slot based on 1 ms (14 symbols) defined in a frame structure based on a numerology having a small SCS value, for example, 15 kHz. To this end, it is possible to define a mini-slot formed of fewer OFDM symbols than the slot. Accordingly, it is possible to define the scheduling for the latency critical data, as in the URLLC, to be performed based on the mini-slot.

Further, methods have been discussed for scheduling data according to latency requirements based on a slot (or a mini-slot) length defined for each numerology, by multiplexing numerologies having different SCS values from one another in one NR carrier, using the TDM or FDM technique, as described above. For example, since the length of a symbol for the SCS of 60 kHz as in FIG. 1 is shortened by about a fourth of that for the SCS of 15 kHz, in case one slot is made up of 14 OFDM symbols in both the cases, the length of the slot based on the SCS of 15 kHz is 1 ms, whereas the length of the slot based on the SCS of 60 kHz is shortened to about 0.25 ms.

Thus, in the NR, there have been discussions on methods for satisfying each requirement of the URLLC and the eMBB, by defining SCSs or TTI lengths each different from another.

That is, in the NR, there have been discussions on a frame structure for supporting a plurality of numerologies each having different subcarrier spacing value from another. Specifically, in the NR, there have been discussion on methods for supporting a numerology family with subcarrier spacing values based on 15 kHz*2^n, and more specifically, it is considered to support the SCS cases of n=0, 1, 2, 3, 4, 5 as then value. Thus, in the NR, since a plurality of numerologies are supported, the length of OFDM symbols may be different depending on SCS values for each numerology as shown in FIG. 1, and the length of slots formed with an identical y value may be also different depending on SCS values. For example, for numerologies N1 and N2 formed with SCS values of 15 kHz and 30 kHz respectively, even in case the number of OFDM symbols forming one slot in each of the N1 and the N2, namely y, is set to 14, the lengths of the corresponding slots are respectively 1 ms and 0.5 ms.

Alternatively, each time-domain scheduling interval different from another may be defined in the time domain for each UE in an identical numerology. For example, it is possible to define a slot formed of 14 symbols or a mini-slot formed of fewer symbols than the slot, as a unit of scheduling in the time domain, or to define a time-domain scheduling unit through slot aggregation by which a plurality of slots are aggregated, for each UE.

Thus, in case it is possible to set a plurality of time-domain scheduling intervals, when, in any NR UE, i) a plurality of numerologies through a single NR frequency band is configured, ii) different numerologies or scheduling spaces between the UL and the DL (e.g. a slot basis for the DL, a mini-slot basis for the UL) are configured, or iii) if carrier aggregation (CA) is supported, different numerologies or scheduling spaces between different component carriers (CC) (e.g. slot basis for CC #1, mini-slot basis for CC #2) are configured, it is necessary to achieve synchronization between the UE and a base station for interpreting information related to a timing relationship configured by DCI or a higher layer for the NR UE.

For example, for an NR UE configured for carrier aggregation of CC #1 of 15 kHz SCS and CC #2 of 60 kHz SCS, in case scheduling is configured based on a slot with y=14 in each of the CC #1 and the CC #2, a unit of the scheduling and a unit of corresponding DL control channel monitoring in each CC may be 1 ms in the CC #1 and 0.25 ms in the CC #2. In this case, in case a timing relationship between the DCI and corresponding data or a timing relationship between data and corresponding ACK/NACK feedback is set to any k value, it is necessary to define whether the timing length used as the reference of the k is 1 ms or 0.25 ms.

For example, in case it is defined that information on timing relationship (e.g. timing gap information) between UL assignment and corresponding UL data transmission is dynamically configured through L1 signaling, namely, UL assignment DCI, on a scheduling interval basis, when a timing gap, k, set through the UL assignment DCI is applied to a UE, it is necessary to define clearly whether the scheduling interval used as a reference is a slot (e.g., 1 ms) formed of 14 symbols based on 15 kHz which is the scheduling interval of the CC #1 or a slot (e.g., 0.25 ms) formed of 14 symbols based on 60 kHz which is the scheduling interval of the CC #2.

In particular, in case cross-carrier scheduling is applied, it is necessary to interpret clearly any difference occurring between i) a time-domain scheduling interval for transmitting DCI and ii) a time-domain scheduling interval for transmitting corresponding data.

As described above, in the NR, as methods for satisfying various usage scenarios, there have been discussions for supporting scheduling units each having different lengths from another in the time domain. In particular, in order to satisfy requirements of the URLLC, it is necessary to divide a scheduling unit in the time domain. However, from a view of an eMBB, the divided time-domain scheduling unit incurs excessive control overhead, and therefore it is undesirable in terms of cell throughput. Furthermore, from a view of an mMTC, a slightly longer time interval resource allocation structure may be more appropriate for coverage enhancement.

In particular, in case it is required to support data transmission/reception related to the eMBB, the URLLC, or the mMTC is required for a UE, it is also necessary to provide a method of allocating a physical downlink shared channel (PDSCH) or a physical uplink shared channel (PUSCH) resource based on time domain scheduling units each different from another for the UE.

In addition, in case carrier aggregation (CA) is configured or activated with a plurality of NR component carriers (CC) or cells operating based on SCSs each different from another for any UE, when scheduling control information of the aggregated NR CCs or cells is transmitted/received, it is necessary to overcome ambiguity in configuring by a base station and interpreting by a UE corresponding time-domain scheduling related information, which is resulted from difference in slot lengths used as a reference of a time-interval scheduling unit for each NR CC.

In addition, in the NR, since a plurality of numerologies are supported and scheduling time intervals (a slot, a mini-slot or slot aggregation) each different from another are supported, it is necessary to overcome ambiguity between the UE and the base station, in defining a timing relationship between DCI and corresponding DL/UL data timing and a timing relationship between DL data reception and corresponding HARQ ACK/NACK feedback timing.

In accordance with some embodiments of the present disclosure, methods are provided for transmitting/receiving DL control information for supporting DL data channel (PDSCH) or UL data channel (PUSCH) allocation based on time-domain scheduling units or transmission time interval (TTI) lengths each different from another, for a UE. Also, methods are provided for indicating by a base station and for interpreting by a UE timing relationship control information including HARQ ACK/NACK feedback timing by a UE in response to DL data reception.

As described above, in the NR, it is necessary to support a short scheduling unit (or TTI) capable of satisfying latency boundary in the time domain in order to support URLLC services. On the contrary, in case a scheduling unit is defined in the time domain in the eMBB or the mMTC, it may be more effective to use a slightly longer time-interval resource allocation unit compared with that of usage scenarios of the URLLC in terms of control overhead and coverage. Thus, as methods for simultaneously satisfying various NR usage scenarios, it is necessary to support a mixed numerology structure for supporting, through one NR carrier, both a numerology of subcarrier spacing (e.g., larger subcarrier spacing, such as 60 kHz, 120 kHz, etc.) that is easy to define a short time-interval resource allocation unit suitable for the URLLC and a numerology of subcarrier spacing (e.g., 15 kHz for eMBB or 3.75 kHZ for mMTC) suitable for the eMBB and the mMTC, or it is necessary to support simultaneously time-domain scheduling units with lengths each different from another, such as a mini-slot, a slot, or aggregated slots in an NR carrier operated with arbitrary one numerology. In particular, in case one UE supports multiple usage scenarios, such as the eMBB, the URLLC, or the mMTC, it is possible for a base station to set a plurality of TTIs for the UE.

In accordance with some embodiments of the present disclosure, in case a plurality of TTI types (e.g. a mini-slot, a slot, aggregated slots, etc.) are supported through one UE, provided are i) a method for allocating a resource of a DL/UL data channel (PDSCH/PUSCH) for the UE, ii) a method for configuring a control resource set (CORESET) related to the resource allocation, and a method for configuring DL control information (DCI).

As described above, it is possible for a base station to set one or more TTIs for a DL data channel (PDSCH) or an UL data channel (PUSCH) for any UE through UE-specific, UE-group specific, or cell-specific higher layer signaling. In particular, one or more TTI types (in the present disclosure, "TTI type" denotes a mini-slot, a slot, or aggregated slots, etc. for defining a corresponding TTI length as a time-interval resource allocation unit for a PDSCH or a PUSCH for any UE, but not limited to words or terms thereof) may be individually set for the PDSCH and the PUSCH or an identical TTI type may be set for the PDSCH and the PUSCH. As another example, the TTI types may be defined as a set of a subcarrier spacing (SCS) and a time-interval scheduling unit based on the SCS, that is, a mini-slot, a slot, aggregated slots, etc. That is, the TTI may be divided into a plurality of types, such as, a mini-slot, a slot or aggregated slots, which are used as a unit of time-interval scheduling defined above. The TTI may also be divided into one or more types, such as, a set of a SCS, time-interval scheduling unit configuration (slot vs. mini-slot vs. aggregated slots, etc.), and/or the number of symbols forming the time-interval scheduling unit (e.g., the number of symbols forming a mini-slot, a slot, or aggregated slots) or the number of aggregated slots, which are parameters for determining an actual TTI length.

Thus, in case a plurality of TTI types is set in order to allocate a PDSCH or PUSCH resource for a UE, when a base station assigns a resource for the PDSCH or PUSCH, it is necessary to indicate a TTI type to be applied to the resource assignment.

In accordance with an embodiment to indicate a TTI type, the TTI type may be defined per a control resource set (CORESET) or a search space, which is configured for transmitting a DL control channel (PDCCH). That is, an NR base station/cell may configure the CORESET for a UE for DL control information (DCI) for the UE within the cell. The CORESET may be configured through UE-specific/UE-group specific/cell-specific higher layer signaling. The search space formed of PDCCH candidates to be monitored by the UE may be defined through each CORESET configured for the UE. In addition, it is possible to define a plurality of CORESETs to be configured for a UE. Thus, in case a CORESET or a corresponding search space is configured for a UE, it is possible to define to indicate the TTI type of a PDSCH or a PUSCH assigned through scheduling control information transmitted through the CORESET, such as DL assignment DCI, UL grant, and the like, through UE-specific/UE-group specific/cell-specific higher layer signaling. That is, the TTI type of a PDSCH or a PUSCH by DCI transmitted through a CORESET or a search space may be configured for each CORESET or search space configured for a UE. Additionally, the base station may set a monitoring period for each CORESET. In this case, the base station may implicitly determine the TTI type corresponding to the CORESET by the monitoring period. As another example, the TTI type may be set independently from the monitoring period. As another example, a DCI format or a transmission mode of the PDSCH and the PUSCH, which is required to be monitored, may be set for each CORESET. In this case, the TTI type may be set implicitly according to the monitoring DCI format information or transmission mode configuration information. Specifically, the DCI format or the transmission mode may be defined separately for each TTI type. When the CORESE is configured, the DCI format or the transmission mode to be monitored through the CORESET may be set, and thus it is possible to define the TTI type of a PDSCH or a PUSCH that is scheduled through the CORESET to be determined implicitly.

As another method of indicating the TTI type, it is possible to define dynamically signaling, through DL assignment DCI or UL grant, a TTI type for a PDSCH or a PUSCH on which resource allocation is performed through the DCI. That is, it is possible to define the TTI type to be indicated directly every when scheduling control information is transmitted through the DCI without limitation to the TTI type scheduled through each CORESET.

Additionally, when the scheduling control information is transmitted through the DCI, it is possible to define to include i) timing indication information between DL assignment DCI and a PDSCH, ii) timing indication information between a PDSCH and HARQ ACK/NACK feedback of a UE, or iii) timing indication information between UL grant and a PUSCH.

As one method of configuring the timing indication information, the timing indication information may be TTI indication information. The timing indication information may be slot index information, mini-slot index information, or starting slot index information. However, slot indexing or mini-slot indexing per each UE may differ according to configuration information of the number of symbols forming a mini-slot or a slot, or the TTI type configured for each UE. That is, in the NR, as described above, the TTI indication information configured for the UE may differ according to a SCS and the number of symbols forming a slot or a mini-slot. For example, for a UE performing scheduling based on a unit of a slot in an NR carrier, substantial slot indexing or mini-slot indexing may differ according to a transmission numerology, that is, a SCS value or the number of symbols (7 or 14) forming a slot or the number of symbols forming a mini-slot per each UE. As another example, slot indexing or mini-slot indexing may differ according to variations of slot configuration information or mini-slot configuration information in a single UE. Accordingly, for the timing indication, it is necessary to define a rule of the slot indexing or the mini-slot indexing. In this regard, in accordance with embodiments of the present disclosure, a method is provided for performing slot indexing and mini-slot indexing based on a unit of 1 ms subframe. That is, the number of slots or mini-slots formed based on a unit of one 1 ms subframe and the boundary of the slots or the mini-slots are determined according to the number of symbols forming a SCS and a slot or a mini-slot configured for a UE. As a result, indexing for each slot or mini-slot may be performed on the subframe basis.

Figure 2:
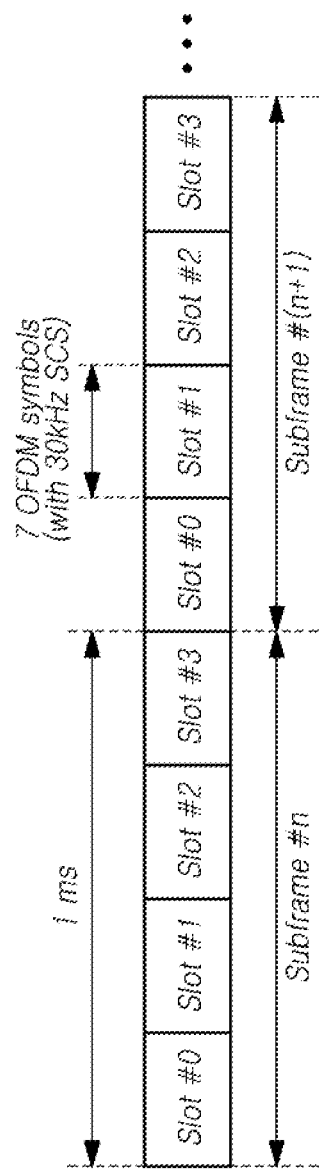
FIG. 2 is a diagram illustrating an example of indexing of slots made up of 7 OFDM symbols in a 30 kHz subcarrier spacing according to embodiments of the present disclosure.

FIG. 2 is a diagram illustrating an example of indexing of slots formed of 7 OFDM symbols in a 30 kHz subcarrier spacing of according to embodiments of the present disclosure.

Referring to FIG. 2, in case the slot formed of 7 symbols based on the 30 kHz SCS is defined as a time-interval scheduling unit for a UE, 4 slots may be formed in a 1 ms subframe, as shown in FIG. 2, and indexing for slots may be performed from slot #0 to slot #3 based on a unit of the subframe.

Figure 3:
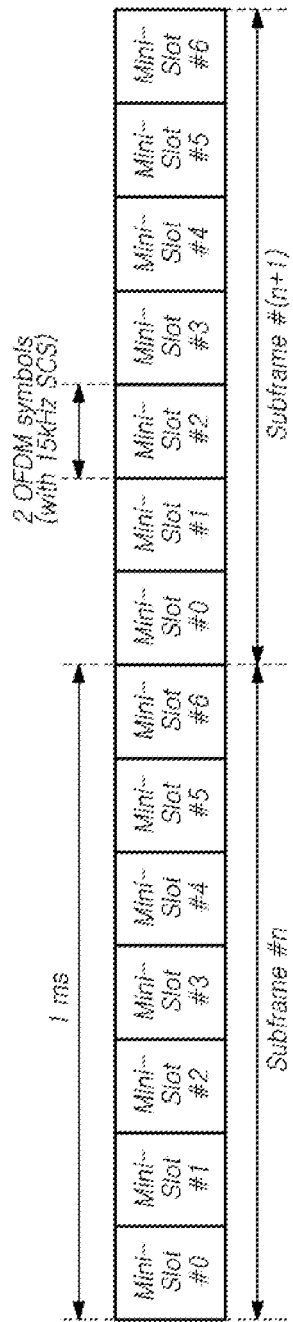
FIG. 3 is a diagram illustrating an example of indexing of mini-slots made up of 2 OFDM symbols in a 15 kHz subcarrier spacing according to embodiments of the present disclosure.

FIG. 3 is a diagram illustrating an example of indexing of mini-slots formed of 2 OFDM symbols in a 15 kHz subcarrier spacing according to embodiments of the present disclosure.

In case the mini-slot formed of 2 symbols based on the 15 kHz SCS is defined as a time-interval scheduling unit for a UE, 7 mini-slots may be formed in a 1 ms subframe, as shown in FIG. 3, and indexing for mini-slots may be performed from slot #0 to slot #6 based on a unit of the subframe.

Thus, TTI indication information may be formed of i) subframe index indication information+slot indication information or ii) subframe index indication information+mini-slot index indication information according to each of TTI types configured for the UE. When mini-slots are configured, if they are not divided equally by 1 ms, the last remaining symbols may not be defined as a mini-slot or the last mini-slot may be formed of the residual symbols in the corresponding subframe.

As another example, slot indexing and mini-slot indexing may be performed based on a unit of a fixed time duration (e.g. radio frame), not the 1 ms subframe.

As another method of configuring timing indication information, the timing indication information may be timing gap information. At this time, the timing gap information may be indicated in a form of an index gap i) between a TTI through which DCI is transmitted and a TTI through which a PDSCH or a PUSCH is transmitted, or ii) between a TTI through which a PDSCH is transmitted and a TTI for HARQ ACK/NACK feedback, according to the slot indexing or mini-slot indexing rule and the TTI type configuration information. As another example, as a method for overcoming ambiguity, timing gap information may be subframe gap information and indication information of a slot index or a mini-slot index in the subframe. That is, the timing gap information may be indicated by the subframe gap information based on a unit of the subframe defined irrelevantly to the TTI type setting, and the timing indication in the subframe may be indicated by absolute slot index or mini-slot index information.

Additionally, slot indexing or mini-slot indexing and timing indication information configuration may be applied regardless of a method of subframe indexing.

Additionally, when a base station or a network configures information on timing relationship and a UE interprets the information on the timing relationship, an ambiguous situation may also occur if CA is configured/activated for a plurality of NR CCs or cells operated based on SCS values each different from another in a UE. Specifically, as described above, timing relationship configuration indication between radio channels, which may be configured by a base station/network and indicated to a UE, may include 1) timing relationship configuration information between DL assignment DCI transmitted through a PDCCH and corresponding PDSCH transmission, 2) timing relationship configuration information between UL grant transmitted through a PDCCH and corresponding PUSCH transmission, 3) timing relationship configuration information between PDSCH reception timing by a UE and corresponding HARQ ACK/NACK feedback timing, or the like. The timing relationship configuration information may be configured by a base station/network and transmitted to a UE through L1 control signaling transmitted through a PDCCH, such as DL assignment DCI and UL grant. Or, the timing relationship configuration information may be transmitted to the UE through UE-specific/cell-specific higher layer signaling.

Thus, in case information on timing relationship between radio channels is configured by a base station/network and transmitted to a UE, it is necessary to achieve synchronization between the UE and the base station for a time unit used as a unit for configuring the timing relationship. For example, in case the information on the timing relationship between the base station and the UE is configured and interpreted on the slot basis, it is necessary to overcome ambiguity between the base station and the UE.

However, a slot length used as a basic time-interval scheduling unit may differ per NR CC, in case carrier aggregation (CA) is configured/activated between NR CCs or cells with SCS values each different from another in a UE. For example, in case CA is configured with i) NR CC #1 configured based on 15 kHz SCS of the normal CP and i) NR CC #2 configured based on 60 kHz SCS of the normal CP, in a UE, and 1 slot is defined as 14 OFDM symbols in normal CP cases, slot lengths in NR CC #1 and the NR CC #2 are respectively 1 ms and 0.25 ms, that is, different from each other, as in FIG. 4.

Thus, in case slot lengths of NR CCs aggregated for a UE differ from one another, it is necessary to define clearly a scheme for timing relationship indication between the UE and the base station.

In particular, in case cross-carrier scheduling is configured between NR CCs with slot lengths each different from another, it is necessary to define a scheme for configuring and interpreting a timing relationship between PDCCH transmission including scheduling DCI configured through higher layer signaling or indication through DL assignment DCI or UL grant and corresponding PDSCH or PUSCH transmission. In addition, in case slot lengths between an NR CC for PDSCH transmission/reception is performed a UE and an NR CC through which a PUCCH for transmitting corresponding HARQ ACK/NACK feedback by the UE is transmitted are different from each other, it is necessary to define a scheme for configuring and interpreting a timing relationship between a PDSCH and a PUCCH.

Embodiments described below may be applied to all UEs, base stations, and core network entities (MME) using various mobile communication technologies. For example, Embodiments of the present disclosure may be applied to not only UEs employing LTE technologies, but also next generation mobile communication (5G mobile communication, New-RAT) devices, base stations, access and mobility functions (AMF). For convenience of description, a base station may denote an eNB of LTE/E-UTRAN, or denote at least one of a central unit (CU), a distribute unit (DU), and an object in which the CU and the DU are implemented as one logical object, or a gNB, in a 5G radio network in which the CU is separated from the DU.

In addition, numerology denotes numerical characteristics and numerical values related to data transmission/reception. The numerology may be determined using a value of a subcarrier spacing (hereinafter, referred to as SCS or subcarrier spacing). That is, a subcarrier spacing may be used for determining whether each numerology is different from another, and therefore different numerologies may mean that subcarrier spacings determining the numerologies are different.

In addition, in the present disclosure, an UL signal means control information or data information transmitted through UL. Or the UL signal may be an UL data channel or an UL control channel.

In addition, in the present disclosure, a timing relationship may be timing between DL assignment DCI transmitted through a DL control channel (PDCCH) and a corresponding DL data channel (PDSCH), or timing between UL grant transmitted through a DL control channel (PDCCH) and a corresponding UL data channel (PUSCH). As another example, the timing relationship may mean timing between a DL data channel (PDSCH) for receiving DL data by a UE and an UL control channel (PUCCH) for transmitting corresponding HARQ ACK/NACK feedback to a base station.

Timing relationship configuration information means information used for configuring the timing relationship and may be expressed as timing granularity. The timing relationship configuration information may include information on a time domain scheduling interval (TTI), a timing gap used for indicating the TTI, a time unit, a slot length, a slot index, and a reference slot index.

The slot length in the present disclosure may be expressed as the number of OFDM symbols forming a slot or as a time occupied by the slot. For example, in case a numerology based on 15 k Hz SCS is used, the length of one symbol may be expressed as 14 OFDM symbols, or expressed as 1 ms.

Figure 5:
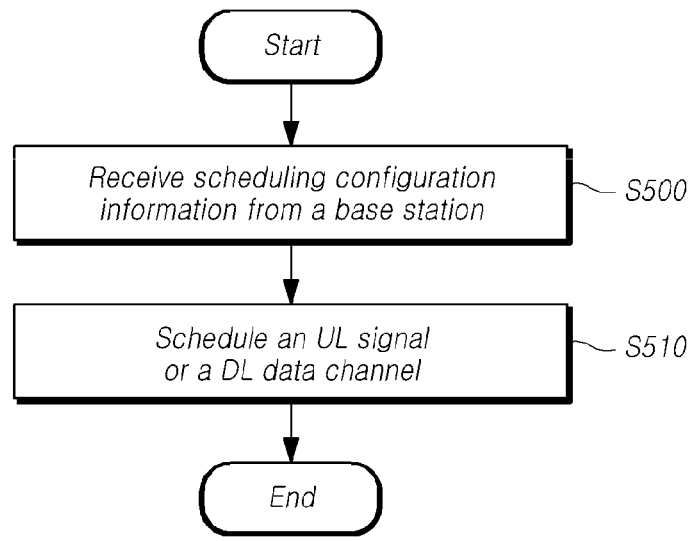
FIG. 5 is a flowchart illustrating a procedure of a user equipment for scheduling an uplink signal and a downlink data channel according to embodiments of the present disclosure.

FIG. 5 is a flowchart illustrating a procedure of a UE for scheduling an UL signal and a DL data channel according to embodiments of the present disclosure.

Referring to FIG. 5, the UE may receive scheduling information on an UL signal and a DL data channel through a DL control channel from a base station at step S500. At this time, a numerology of a carrier for receiving the DL control channel by the UE may be different from a numerology of the DL data channel or a UL data channel for the DL control channel, or a numerology for receiving the DL data channel may be different from a numerology of an UL control channel for the DL data channel.

A value of a subcarrier spacing is used for determining whether each numerology is different from another. Therefore, a subcarrier spacing value used in the DL control channel of the UE may be different from a subcarrier spacing value used in an UL signal and DL data.

For example, in case a UE receives a DL control channel (PDCCH) and schedules a DL data channel based on DL assignment DCI included in the DL control channel, a subcarrier spacing value used in the DL control channel may be different from a subcarrier spacing value used in an UL control channel.

As another example, in case a UE receives a DL control channel (PDCCH) and schedules an UL data channel (PUSCH) based on UL grant included in the DL control channel, a subcarrier spacing value used in the DL control channel may be different from a subcarrier spacing value used in the UL data channel.

As further another example, in case a UE receives data through a DL data channel (PDSCH) and transmits corresponding HARQ ACK/NACK feedback through an UL control channel, a subcarrier spacing value used in the DL data channel may be different from a subcarrier spacing value used in the UL control channel.

In case the UE uses CA, a component carrier for receiving a DL control channel may be different from a component carrier for transmitting/receiving an UL signal or a DL data channel.

However, in case CA is not used in the UE, and scheduling intervals in time domain between the DL and the UL are set differently from each other, a carrier for receiving a DL control channel may be identical to a carrier for transmitting an UL signal. In addition, when an UL signal, that is, an UL data channel or an UL control channel, is transmitted to a base station, the UL signal may be transmitted through supplementary UL (SUL) used for the UL signal.

In order to overcome an ambiguity problem in the timing relationship, the base station may configure timing relationship configuration information based on a reference numerology, and then the UE may receive and use the timing relationship configuration information from the base station.

The UE may receive scheduling information through DCI signaling from the base station. The UE may detect DCI received through a DL control channel (PDCCH), and use the timing relationship configuration information included in the scheduling information included in the DCI.

In addition, the UE may receive the scheduling information from the base station through higher layer signaling.

That is, the UE may receive the scheduling information from the base station through UE-specific RRC signaling The UE may schedule an UL signal or a DL data channel based on the scheduling information received from the base station at step S510. In this case, the scheduling information may include timing relationship configuration information on a DL control channel and an UL signal and a DL data channel.

At this time, the timing relationship configuration information between the DL control channel and the DL data channel or the UL data channel for the DL control channel may be configured based on a unit of a slot based on a numerology used for receiving the DL data channel or based on a unit of a slot based on a numerology used for transmitting the UL data channel. In this case, even if the transmission of the DL control channel is performed based on a unit of a mini-slot, the transmission/reception of the DL data channel or the UL data channel may be performed based on a unit of a slot only.

In addition, the timing relationship configuration information between the DL data channel and the UL control channel for the DL data channel may be configured based on a unit of a slot based on a numerology of the UL control channel. In this case, even if the transmission of the DL data channel is performed based on a unit of a mini-slot, the transmission of the UL control channel may be performed based on a unit of a slot only.

That is, when interpreting a timing relationship between a DL control channel and an UL signal and a DL data channel scheduled by the DL control channel, according to the timing relationship configuration information, the UE may interpret the timing relationship based on a numerology used in the UL signal and the DL data channel.

Figure 6:
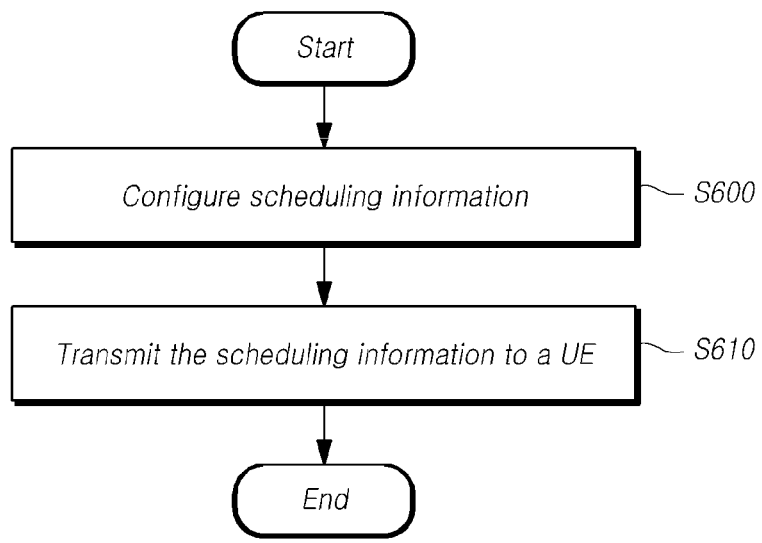
FIG. 6 is a flowchart illustrating a procedure of a base station for scheduling an uplink signal and a downlink data channel according to embodiments of the present disclosure.

FIG. 6 is a flowchart illustrating a procedure of a base station for scheduling an UL signal and a DL data channel according to embodiments of the present disclosure.

Referring to FIG. 6, the base station may configure scheduling information for scheduling an UL signal and a DL data channel at step S600. As described above, a numerology of a carrier for receiving a DL control channel may be different from a numerology of a DL data channel or an UL Data channel for the DL control channel, or a numerology for receiving the DL data channel may be different from a numerology of an UL control channel for the DL data channel. A subcarrier spacing value may be used for determining whether each numerology is different from another. Therefore, a subcarrier spacing value of a carrier for receiving a DL control channel by the UE may be different from a subcarrier spacing value of a carrier for transmitting/receiving an UL signal and DL data.

For example, in case a base station transmits a DL control channel (PDCCH) and a UE schedules a DL data channel based on DL assignment DCI included in the DL control channel, a subcarrier spacing value used in the DL control channel may be different from a subcarrier spacing value used in an UL control channel.

As another example, in case a base station transmits a DL control channel (PDCCH) and a UE schedules an UL data channel (PUSCH) based on UL grant included in the DL control channel, a subcarrier spacing value used in the DL control channel may be different from a subcarrier spacing value used in the UL data channel.

As further another example, in case a base station transmits data to a UE through a DL data channel (PDSCH) and receives corresponding HARQ ACK/NACK feedback through an UL control channel, a subcarrier spacing value used for receiving the DL data channel may be different from a subcarrier spacing value used in the UL control channel.

In case the UE uses CA, a component carrier for transmitting a DL control channel may be different from a component carrier for transmitting/receiving an UL signal or a DL data channel.

However, in case CA is not used in the UE, and scheduling intervals in the time domain between the DL and the UL are set differently from each other, a carrier for transmitting a DL control channel may be identical to a carrier for receiving an UL signal. In addition, when an UL signal, that is, an UL data channel or an UL control channel, is transmitted to a base station, the UL signal may be transmitted through supplementary UL (SUL).

In order to overcome an ambiguity problem in the timing relationship, the base station may configure scheduling information for scheduling an UL signal and a DL data channel, and the UE may receive the scheduling information from the base station and use the received information.

The base station may transmit the scheduling information through DCI signaling to the UE. The UE may detect DCI received through a DL control channel (PDCCH), and use the timing relationship configuration information included in scheduling information included in the DCI.

In addition, the base station may transmit the scheduling information to the UE through higher layer signaling. That is, the base station may transmit the scheduling information to the UE through UE-specific RRC signaling.

In addition, the base station may transmit the scheduling information on an UL signal and a DL data channel through a DL control channel to the UE at step S610. In this case, timing relationship configuration information between the DL control channel and the DL data channel or the UL data channel for the DL control channel may be configured i) based on a unit of a slot based on a numerology used for transmitting the DL data channel or ii) based on a unit of a slot based on a numerology used for receiving the UL data channel. In this case, even if the transmission of the DL control channel is performed based on a unit of a mini-slot, the transmission/reception of the DL data channel or the UL data channel may be performed based on a unit of a slot only.

In addition, the timing relationship configuration information between the DL data channel and the UL control channel for the DL data channel may be formed based on a unit of a slot based on a numerology of the UL control channel. In this case, even if the transmission of the DL data channel is performed based on a unit of a mini-slot, the transmission of the UL control channel may be performed based on a unit of a slot only.

That is, when configuring the timing relationship configuration information between the DL control channel and the UL signal and the DL data channel scheduled by the DL control channel, the base station may form the timing relationship configuration information based on a numerology of a carrier for transmitting/receiving the UL signal and DL data.

Hereinafter, various embodiments of methods of a UE and a base station for scheduling an UL signal or a DL data channel described above will be discussed in detail.

The embodiments described above has been discussed based on a case in which a time-domain scheduling interval difference between DCI and corresponding data transmission/reception occurs when carrier aggregation is used, while embodiments described below may be applied to all cases in which a time-domain scheduling interval difference between the DCI and corresponding data transmission/reception occurs.

For example, the embodiments may include a case where a DL numerology for transmitting UL assignment DCI and an UL numerology for transmitting corresponding data are configured differently from each other, or a case where a time-domain scheduling interval of the DL for transmitting the UL assignment DCI is set based on a slot and a time-domain scheduling interval for transmitting corresponding UL data may be set based on a mini-slot.

In addition, the present disclosure may be applied to i) all cases where time-domain scheduling intervals for the DCI and corresponding data transmission are different or ii) all cases where time-domain scheduling intervals for DL data reception and an NR PUCCH configuration for corresponding HARQ ACK/NACK feedback UCI transmission are different.

Some embodiments described below can be applied individually or in any combination.

Embodiment 1. Directly Indicating Index Information

Figure 4:
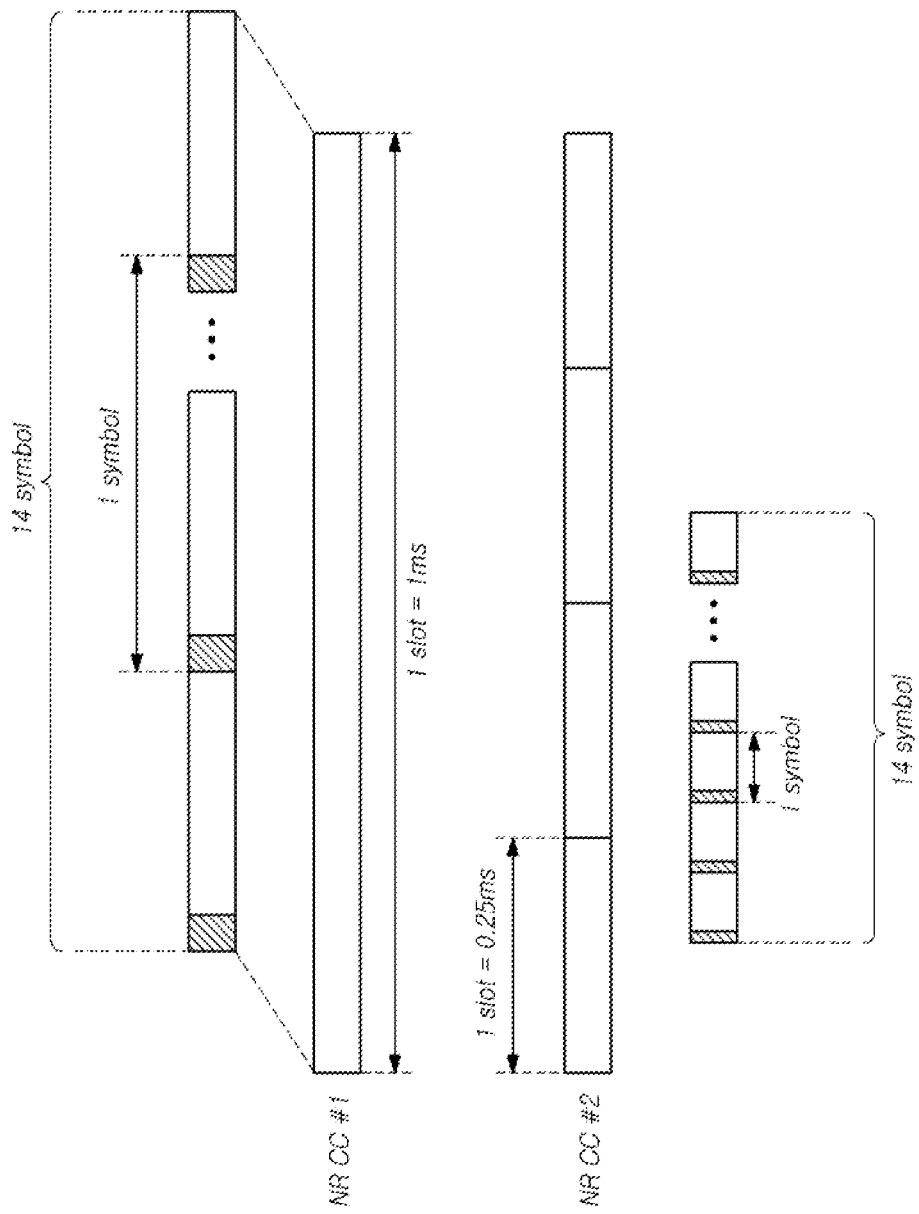
FIG. 4 is a diagram illustrating carrier aggregation of i) NR component carrier #1 with 15 kHz subcarrier spacing and ii) NR component carrier #2 with 60 kHz subcarrier spacing, according to embodiments of the present disclosure.

As a method of configuring timing relationship indication information between CCs each having different slot lengths from another, it is possible to indicate directly timing index information of CCs for performing scheduling. For example, as shown in FIG. 4, in case CA is activated for a plurality of CCs that have different SCSs from one another and corresponding slot lengths for a UE, and cross-carrier scheduling is configured for the UE such that scheduling for a PDSCH or PUSCH of NR CC #2 is performed through NR CC #1, a base station/network may include absolute timing index indication information for PDSCH or PUSCH transmission/reception in the NR CC #2 on scheduling DCI (e.g. DL assignment DCI or UL grant) transmitted through the PDCCH of the NR CC #1, and then transmit the included information to the UE.

Specifically, the absolute timing index indication information may be configured of slot index indication information or subframe index indication information in the NR CC #2. In addition, the absolute timing index indication information may be configured in a hierarchical structure, for example, {a subframe index+a slot index in the subframe} indication information, {a radio frame index+a slot index in the radio frame} indication information, or {a radio frame index+a subframe index in the radio frame+a slot index in the subframe} indication information.

Embodiment 2 Timing Gap Information Indication

As a method of configuring timing relationship indication information by a base station and interpreting it by a UE, timing relationship information may be scheduling DCI and timing gap information between corresponding PDSCH or PUSCH transmission/reception resources.

In this case, when the timing gap indication information is configured, there is a possibility of ambiguity in setting and interpreting a timing gap depending on a difference in SCS values and corresponding slot lengths of a scheduling CC for PDCCH transmission including scheduling control information and a scheduled CC for corresponding PDSCH or PUSCH transmission.

For example, as shown in FIG. 4, it is assumed that carrier aggregation (CA) of the NR CC #1 of 15 kHz SCS and the NR CC #2 of 60 kHz SCS are configured in an NR UE. In this case, when a time-domain scheduling unit for each CC is configured for the UE, in case a unit of scheduling is set based on a slot of y=14 in the CC #1 and based on a slot of y=14 in the CC #2, a TTI or slot of 1 ms is configured in the CC #1 and a TTI or slot of 0.25 ms is configured in the CC #2. In case cross-carrier scheduling is configured such that scheduling control information (DCI) for an UL/DL data channel of the CC #2 is transmitted through the CC #1, when timing gap information between scheduling DCI transmitted through a PDCCH of the CC #1 and a corresponding PDSCH or PUSCH is configured/interpreted, there is possibility of ambiguity depending on CCs for transmitting the PDSCH or PUSCH. That is, in the case of PDSCH or PUSCH transmission/reception through the CC #1, a TTI length or slot length used as a unit of time-interval scheduling of the PDSCH or the PUSCH is 1 ms. In the case of PDSCH or PUSCH transmission/reception through the CC #2, a TTI length or slot length used as a unit of time-interval scheduling of the PDSCH or the PUSCH is 0.25 ms. Accordingly, it is necessary to configure clearly time-domain granularity used as a unit of corresponding timing gap indication, because TTI or slot lengths each different from another may be defined for each CC.

Embodiment 2.1 Timing Gap Indication Based on the TTI of a Scheduled CC 2.1.1 Relationship Between a PDCCH and PDSCH or PUSCH Transmission Corresponding to DCI Included in the PDCCH In case CA is configured with NR CCs having TTI or slot lengths each different from another, or cross-carrier scheduling is additionally configured, as another method of configuring timing gap information by a base station and interpreting it by a UE, regardless of TTI or slot lengths depending on SCS values set in NR CCs for PDCCH transmission including scheduling control information, such as, DL assignment DCI or UL grant, for the UE, the timing gap information may be configured by the base station and interpreted by the UE, based on TTI or slot lengths depending on SCS values of NR CCs for PDSCH or PUSCH transmission corresponding to the DCI.

That is, as shown in FIG. 4, for an NR UE supporting CA configured with the NR CC #1 of 15 kHz SCS and the NR CC #2 of 60 kHz SCS, in case scheduling DCI (e.g. DL assignment DCI or UL grant) for the UE is scheduling DCI for PDSCH or PUSCH transmission in the NR CC #1, a timing gap value between the scheduling DCI and the corresponding PDSCH or PUSCH transmission may be set by the base station and interpreted by the UE based on a unit of a slot in the NR CC #1 for transmitting the PDSCH or PUSCH, that is, a unit of 1 ms slot, and in case scheduling DCI (e.g. DL assignment DCI or UL grant) for the UE is scheduling DCI for PDSCH or PUSCH transmission in the NR CC #2, a timing gap value between the scheduling DCI and the PDSCH or PUSCH transmission may be set by the base station and interpreted by the UE based on a unit of a slot in the NR CC #2 for the PDSCH or PUSCH transmission, that is, a unit of 0.25 ms slot. A reference subcarrier spacing used as basis for configuring timing relationship configuration information may be a subcarrier spacing of a component carrier for corresponding PDSCH or PUSCH transmission.

At this time, the PUSCH may be transmitted through supplementary UL (SUL) for PUSCH transmission. The supplementary UL (SUL) means separately established UL for enabling data to be transmitted to a base station through a low-frequency band in order to address coverage issues that may occur when a UE transmits/receives data using a high-frequency band.

In this case, it may be necessary to define a reference point for applying the timing gap, that is, a reference slot index. For example, in FIG. 4, in case cross-carrier scheduling is configured such that scheduling DCI for an UL/DL data channel of the CC #2 is transmitted through a PDCCH of the CC #1, it is possible to define timing gap information between PDSCH or PUSCH transmission in the CC #2 and PDCCH transmission in the NR CC #1 including corresponding scheduling DCI to be configured by a base station and interpreted by a UE, based on a unit of a TTI or slot length of 0.25 ms of the CC #2 for the PDSCH or PUSCH transmission/reception. Accordingly, in case the timing gap information is configured with k, it is necessary to define a reference slot of the NR CC #2 used as a reference point for timing gap counting corresponding to k slots in a unit of the 0.25 ms slot. As a method for defining the reference slot, it is possible to determine a reference slot for timing gap counting of an NR CC through which a PDSCH or PUSCH is transmitted, according to a SCS of an NR CC through which the DCI is transmitted and a SCS of the NR CC through which the PDSCH or PUSCH is transmitted. For example, it is possible to define the reference slot according to a ratio of a SCS for DCI transmission to a SCS for PDSCH or PUSCH transmission. Specifically, in case a SCS of an NR CC for DCI transmission, that is, a scheduling CC, is A kHz, and a SCS of an NR CC for corresponding PDSCH or PUSCH transmission, that is, a scheduled CC, is B kHz, when a slot index for PDCCH transmission including scheduling DCI in the scheduling CC is n, it is possible to define $$\left\lfloor \frac{n \cdot B}{A} \right\rfloor$$

as a reference slot index for timing gap counting in the scheduled CC. Thus, as described above, in case timing gap information is configured with k, and a slot index on which the DCI is transmitted in the scheduling CC is n, a slot index for the PDSCH or PUSCH transmission in the scheduled CC may be defined as $$\left\lfloor \frac{n \cdot B}{A} \right\rfloor_{+k}.$$

$\lfloor m \rfloor$ is a floor function, that is, means the maximum integer less than or equal to m.

Alternatively, it is possible to define, as a reference slot index, a slot index of a scheduled CC overlapped in the time domain with one or more symbols for PDCCH transmission including scheduling DCI or completed in the scheduling CC. In case there are a plurality of slots of the scheduled CC overlapped in the time domain with one or more symbols for the PDCCH transmission or completed in the scheduling CC, it is possible to define i) the largest or the last slot index or ii) the smallest or the first slot index among the corresponding slots as a reference slot index.

2.1.2 Relationship Between a PDSCH and PUCCH Transmission Including HARQ ACK/NACK Feedback Information For the PDSCH As another example, methods are provided for timing indication and timing interpretation with respect to a difference between a SCS value for transmitting the PDSCH and a SCS value for transmitting the PUCCH for HARQ ACK/NACK feedback of a UE and a difference between a DL slot length corresponding to the PDSCH transmission and an UL slot length corresponding to the PUCCH transmission.

As described above, as shown in FIG. 4, in case CA is configured with NR CC #1 configured based on 15 kHz SCS of the normal CP and NR CC #2 configured based on 60 kHz SCS of the normal CP, in a UE, and 1 slot is defined as 14 OFDM symbols in normal CP cases, slot lengths in NR CC #1 and the NR CC #2 are respectively 1 ms and 0.25 ms, that is, different from each other.

In addition, in the case of the NR CC #2, a DL (or UL) slot may be configured on an NR carrier/cell established in a high-frequency band, and the NR CC #1 may be configured on a carrier/cell which is supplementary UL (SUL) and which is established in a low-frequency band. The supplementary UL (SUL) means separately established UL for enabling data to be transmitted to a base station through a low-frequency band in order to address coverage issues that may occur when a UE transmits/receives data using a high-frequency band.

In this case, PUCCH transmission for HARQ ACK/NACK feedback of the UE for PDSCH transmission of the NR CC #2 may be performed through the NR CC #1.

At this time, as a method for setting by a base station and interpreting by a UE, a timing gap, namely k1 value, between the PDSCH transmission in the NR CC #2 and the PUCCH transmission for corresponding HARQ ACK/NACK feedback in the NR CC #1, as described above, it is possible the k1 value to be set by the base station and interpreted by the UE, based on a slot length of the NR CC #1 for the PUCCH transmission including the HARQ ACK/NACK feedback. That is, as shown in FIG. 4, the k1 value may be set and interpreted, based on a unit of 1 ms, which is a length of an UL slot of the NR CC #1 for the PUCCH transmission. At this time, a reference numerology used as a basis for configuring timing relationship configuration information is the numerology of the NR CC #1 for the PUCCH transmission.

Additionally, it may be necessary to define a reference point for applying the k1 value, that is, a reference slot index. That is, as described above, timing gap information between the PDSCH transmission in the NR CC #2 and the PUCCH transmission in the NR CC #1 (e.g., SUL) including the corresponding HARQ ACK/NACK feedback of the UE may be configured by the base station and interpreted by the UE, based on a unit of the TTI or slot length of 1 ms of the CC #1 for the PUCCH transmission/reception. Thus, in case the timing gap information is configured with k1, it is necessary to define a reference slot index in the NR CC #1 used as a reference point for timing gap counting corresponding to k1 slots based on a unit of 1 ms slot.

As a method for defining the reference slot index, it is possible to define the reference slot index depending on a ratio between a SCS through which the PDSCH transmission is performed and a SCS for the PUCCH transmission. More specifically, in case a SCS of an NR CC for the PDSCH transmission is A kHz (in this Embodiment, 60 kHz of the NR CC #2), and a SCS of an NR CC for the PUCCH transmission is B kHz (in this Embodiment, 15 kHz of the NR CC #1), when a slot index for the PDSCH transmission in the NR CC #2 is n, it is possible to define a reference slot index in an NR CC (e.g., NR CC #1) for the PUCCH transmission for counting the timing gap for the PUCCH transmission, k1 slot(s), as $$\left\lfloor \frac{n \cdot B}{A} \right\rfloor.$$

Accordingly, in case the timing gap information is configured with the k1, a slot index for transmitting the PDSCH in the NR CC #2 is n, a slot index for transmitting the d in the NR CC #1 is defined as $$\lfloor \frac{n \cdot B}{A} \rfloor_{+k1}$$

depending on the timing gap, k1 value. For the number m, $\lfloor m \rfloor$ is a floor function, that is, means the maximum integer less than or equal to m.

Alternatively, it is possible to define, as a reference slot index, the slot index of the NR CC #1 for the PUCCH transmission, which is overlapped in the time domain with one or more symbols for the PDSCH transmission or completed in the NR CC #2. In case there are a plurality of slots of the NR CC #1 for the PUCCH transmission, which is overlapped in the time domain with one or more symbols for the PDSCH transmission or completed in the NR CC #2, it is possible to define i) the largest or the last slot index or ii) the smallest or the first slot index among the corresponding slots as a reference slot index.

Embodiment 2-2 Timing Gap Indication Based on a TTI of a Scheduling CC

As another method of configuring timing gap information by a base station and interpreting it by a UE, in case cross-carrier scheduling is configured for a UE, regardless of a TTI or slot length depending on a SCS value of an NR CC for transmitting/receiving PDSCH or PUSCH, that is, a scheduled CC, the timing gap information may be configured by the base station and interpreted by the UE, based on a TTI or slot length depending on a SCS value of an NR CC for transmitting PUCCH including scheduling DCI (e.g., DL assignment DCI or UL grant) for the PDSCH or PUSCH, that is, a scheduling CC. For example, it is assumed that CA of the NR CC #1 of 15 kHz SCS and the NR CC #2 of 60 kHz SCS are configured in an NR UE.

In this case, it is possible for timing gap information between a PDSCH or PUSCH transmitted through the CC #2 and DCI including corresponding scheduling information to be configured by a base station and interpreted by the UE, using a timing gap value based on a unit of a TTI or slot length of the CC #1 for PDCCH transmission including corresponding scheduling DCI. That is, it is possible to define the timing gap information to mean a timing gap based on a unit of not a TTI or slot length of 0.25 ms configured in the CC #2 for the PDSCH or PUSCH transmission/reception, but a TTI or slot length of 1 ms configured in the CC #1 for the DCI transmission. Thus, in case the timing gap information is configured with k, a method of indicating the timing relationship may be performed such a manner that the PDSCH or PUSCH transmission/reception is performed through the first slot for the NR CC #2 after k slots based on a unit of 1 ms slot, that is, the first slot of the CC #2 after k*1 ms, from a slot on which the DCI transmission is performed in the CC #1.

As described above, in case the timing gap information is configured by the base station and interpreted by the UE based on a unit of a TTI or slot length of a scheduling CC, when a slot index of the scheduling CC for the PDCCH transmission including corresponding scheduling DCI is n, and timing gap setting value is k, the PDSCH or PUSCH transmission may be performed through the first slot of a scheduled CC after (k*(a slot length of the scheduled CC)) ms from the starting point or the end point of slot #n of the scheduling CC.

Additionally, the above methods for indicating the timing relationship is applicable to all types of signaling for indicating a timing relationship. That is, the above methods for indicating the timing may be applied in all cases where timing relationship information is configured through higher layer signaling, MAC CE signaling, or L1 control signaling.

Figure 7:
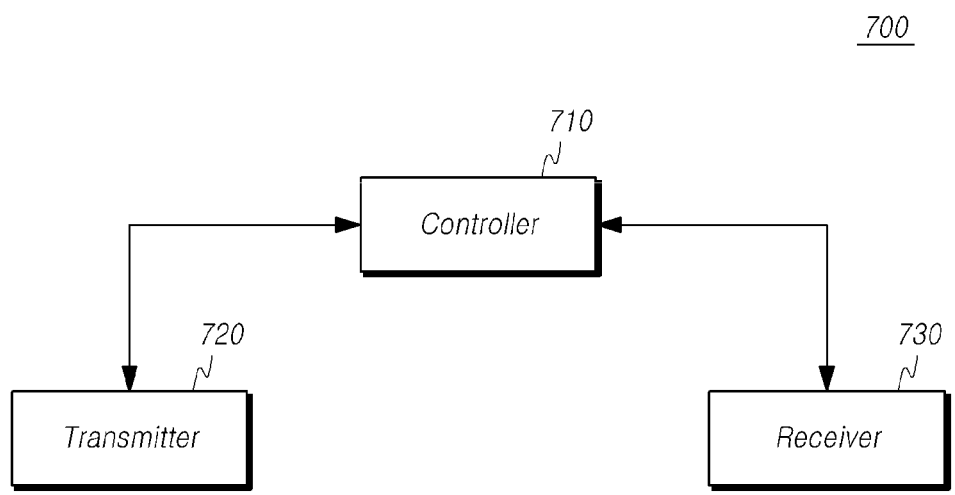
FIG. 7 is a block diagram illustrating a base station according to embodiments of the present disclosure.

FIG. 7 is a block diagram illustrating a base station according to embodiments of the present disclosure.

Referring to FIG. 7, the base station 700 includes a controller 710, a transmitter 720 and a receiver 730.

The controller 710 configures scheduling information for scheduling an UL signal and a DL data channel. The scheduling information may include timing relationship configuration information between a DL control channel and a DL data channel or a UL data channel for the DL control channel and timing relationship configuration information between the DL data channel and a UL control channel for the DL data channel. The scheduling information may be included in DL control information (DCI) transmitted through the DL control channel.

In this case, a numerology of a carrier through which the DL control channel is received may be different from a numerology of the DL data channel or the UL data channel for the DL control channel, or a numerology of a carrier through which the DL data channel is received may be different from a numerology of the UL control channel for the DL data channel.

At this time, timing relationship configuration information between the DL control channel and the DL data channel or the UL data channel for the DL control channel may be configured i) based on a unit of a slot based on a numerology used for transmitting the DL data channel or ii) based on a unit of a slot based on a numerology used for receiving the UL data channel. In addition, timing relationship configuration information between the DL data channel and the UL control channel for the DL data channel may be configured based on a unit of a slot based on a numerology of the UL control channel.

At this time, in case a UE uses CA, a component carrier for transmitting the DL control channel may be different from a component carrier for receiving and transmitting an UL signal or the DL data channel. However, in case CA is not used in the UE, and scheduling intervals in the time domain between the DL and the UL are set differently from each other, a carrier for transmitting the DL control channel may be identical to a carrier for receiving the UL signal. In addition, when an UL data channel or an UL control channel is transmitted to the base station, the UL data channel or the UL control channel may be transmitted through supplementary UL (SUL).

The transmitter 720 and the receiver 730 respectively are configured to transmit and receive signals, messages, and data necessary for carrying out some embodiments as described above, to and from the UE.

The transmitter 720 is configured to transmit, to the UE, the scheduling information on the UL signal and the DL data channel through the DL control channel. The UE may schedule the UL signal and the DL data channel based on the timing relationship configuration information received from the base station.

Figure 8:
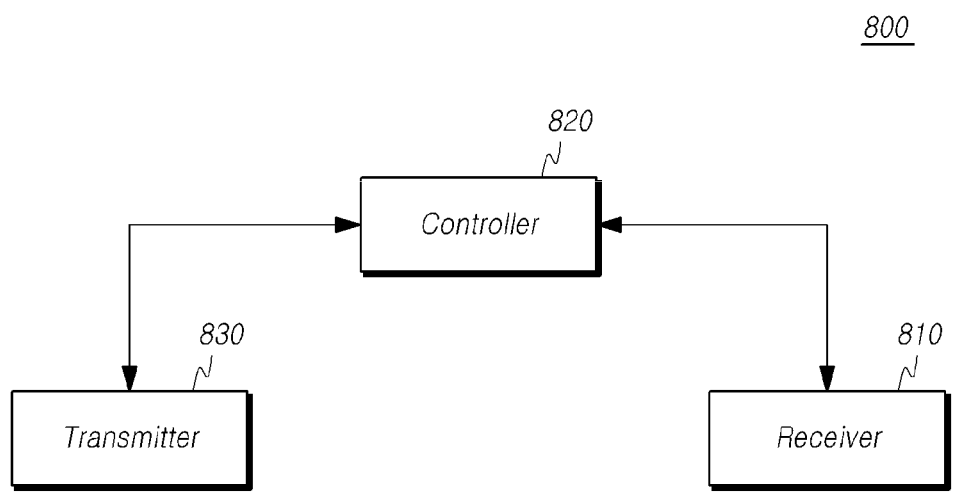
FIG. 8 is a block diagram illustrating a user equipment according to embodiments of the present disclosure.

FIG. 8 is a block diagram illustrating a UE according to embodiments of the present disclosure.

Referring to FIG. 8, the UE 800 includes a receiver 810, a controller 820 and a transmitter 830.

The receiver 810 is configured to receive DL control information, data, and messages from a base station through a corresponding channel. Specifically, the receiver 810 is configured to receive, from the base station, scheduling information on an UL signal and a DL data channel through a DL control channel.

At this time, the scheduling information may include timing relationship configuration information between the DL control channel and the DL data channel or a UL data channel for the DL control channel and timing relationship configuration information between the DL data channel and an UL control channel for the DL data channel. The scheduling information may be included in DL control information (DCI) transmitted through the DL control channel.

The controller 820 is configured to schedule the UL signal and the DL data channel based on scheduling information.

A numerology of a carrier through which the DL control channel is received may be different from a numerology of the DL data channel or the UL data channel for the DL control channel, or a numerology for receiving the DL data channel may be different from a numerology of the UL control channel for the DL data channel. At this time, timing relationship configuration information between the DL control channel and the DL data channel or the UL data channel for the DL control channel may be configured i) based on a unit of a slot based on a numerology used for transmitting the DL data channel or ii) based on a unit of a slot based on a numerology used for receiving the UL data channel. In addition, timing relationship configuration information between the DL data channel and the UL control channel for the DL data channel may be configured based on a unit of a slot based on a numerology of the UL control channel.

In case the UE uses CA, a component carrier for transmitting the DL control channel may be different from a component carrier through which the UL signal or the DL data channel is transmitted or received.

However, in case CA is not used in the UE, and scheduling intervals in the time domain between the DL and the UL are set differently from each other, a carrier for receiving the DL control channel may be identical to a carrier for transmitting the UL signal. In addition, when the UL data channel or the UL control channel is transmitted to the base station, the UL data channel or the UL control channel may be transmitted through supplementary UL (SUL).

The transmitter 830 is configured to transmit UL control information, data, and messages to the base station through a corresponding channel.

The standardized specifications or standard documents related to the embodiments described above constitute a part of the present disclosure. Accordingly, it should be construed that the incorporation of the content of the standardized specifications and part of the standard documents into the detailed description and claims is included within the scope of the present disclosure.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes, but to describe the embodiments, the therefore, the scope of the present disclosure shall not be limited to such embodiments. The scope of protection of the present disclosure should be construed based on the following claims, and all technical ideas within the scope of equivalents thereof should be construed as being included within the scope of the present disclosure.

The invention claimed is:

1. A method of a user equipment for scheduling an uplink (UL) signal or a downlink (DL) data channel, the method comprising:
    receiving, from a base station, scheduling information on the UL signal and the DL data channel through a DL control channel; and
    scheduling the UL signal and the DL data channel based on the scheduling information,
    wherein the UL signal includes an UL data channel or an UL control channel,
    wherein the scheduling information includes timing relationship configuration information between the DL control channel and the DL data channel or the UL data channel for the DL control channel and timing relationship configuration information between the DL data channel and the UL control channel for the DL data channel,
    wherein a numerology of a carrier for receiving the DL control channel is different from a numerology of the DL data channel or the UL data channel for the DL control channel, or a numerology of a carrier for receiving the DL data channel is different from a numerology of the UL control channel for the DL data channel, and
    wherein the timing relationship configuration information between the DL control channel and the DL data channel or the UL data channel for the DL control channel includes timing gap information between the DL control channel and the DL data channel or the UL data channel for the DL control channel, and when a slot index of the DL control channel is n, a value of a subcarrier spacing of the carrier for receiving the DL control channel is A kHz, a value of a subcarrier spacing of a carrier of the DL data channel or the UL data channel for the DL control channel is B kHz, and a value of the timing gap information is k, a slot index of the DL data channel or the UL data channel for the DL control channel is determined as $$\left\lfloor \frac{n \cdot B}{A} \right\rfloor_{+k}.$$

2. The method according to claim 1, wherein the timing relationship configuration information between the DL control channel and the DL data channel or the UL data channel for the DL control channel is configured based on a unit of a slot based on a numerology used for receiving the DL data channel, or based on a unit of a slot based on a numerology used for transmitting the UL data channel.

3. The method according to claim 1, wherein the timing relationship configuration information between the DL data channel and the UL control channel for the DL data channel is configured based on a unit of a slot based on the numerology of the UL control channel.

4. The method according to claim 1, wherein a carrier for receiving the DL control channel is different from a carrier for transmitting and receiving the UL signal or the DL data channel.

5. The method according to claim 1, wherein the scheduling information is included in DL control information (DCI) received through the DL control channel.

6. A method of a base station for scheduling an uplink (UL) signal or a downlink (DL) data channel, the method comprising:
configuring scheduling information for scheduling the UL signal and the DL data channel; and
transmitting, to a user equipment, the scheduling information on the UL signal and the DL data channel through a DL control channel,
wherein the UL signal includes an UL data channel or an UL control channel,
wherein the scheduling information includes timing relationship configuration information between the DL control channel and the DL data channel or the UL data channel for the DL control channel and timing relationship configuration information between the DL data channel and the UL control channel for the DL data channel, wherein a numerology of a carrier for receiving the DL control channel is different from a numerology of the DL data channel or the UL data channel for the DL control channel, or a numerology of a carrier for receiving the DL data channel is different from a numerology of the UL control channel for the DL data channel, and
wherein the timing relationship configuration information between the DL control channel and the DL data channel or the UL data channel for the DL control channel includes timing gap information between the DL control channel and the DL data channel or the UL data channel for the DL control channel, and when a slot index of the DL control channel is n, a value of a subcarrier spacing of the carrier for receiving the DL control channel is A kHz, a value of a subcarrier spacing of a carrier of the DL data channel or the UL data channel for the DL control channel is B kHz, and a value of the timing gap information is k, a slot index of the DL data channel or the UL data channel for the DL control channel is determined as $$\left\lfloor \frac{n \cdot B}{A} \right\rfloor_{+k}.$$

7. The method according to claim 6, wherein the timing relationship configuration information between the DL control channel and the DL data channel or the UL data channel for the DL control channel is configured based on a unit of a slot based on a numerology used for transmitting the DL data channel, or based on a unit of a slot based on a numerology used for receiving the UL data channel.

8. A user equipment for scheduling an uplink (UL) signal or a downlink (DL) data channel, the user equipment comprising:
a receiver configured to receive, from a base station, scheduling information on the UL signal and the DL data channel through a DL control channel; and
a controller configured to schedule the UL signal and the DL data channel based on the scheduling information,
wherein the UL signal includes an UL data channel or an UL control channel,
wherein the scheduling information includes timing relationship configuration information between the DL control channel and the DL data channel or the UL data channel for the DL control channel and timing relationship configuration information between the DL data channel and the UL control channel for the DL data channel,
wherein a numerology of a carrier for receiving the DL control channel is different from a numerology of the DL data channel or the UL data channel for the DL control channel, or a numerology of a carrier for receiving the DL data channel is different from a numerology of the UL control channel for the DL data channel, and
wherein the timing relationship configuration information between the DL control channel and the DL data channel or the UL data channel for the DL control channel includes timing gap information between the DL control channel and the DL data channel or the UL data channel for the DL control channel, and when a slot index of the DL control channel is n, a value of a subcarrier spacing of the carrier for receiving the DL control channel is A kHz, a value of a subcarrier spacing of a carrier of the DL data channel or the UL data channel for the DL control channel is B kHz, and a value of the timing gap information is k, a slot index of the DL data channel or the UL data channel for the DL control channel is determined as $$\left\lfloor \frac{n \cdot B}{A} \right\rfloor_{+k}.$$

9. The user equipment according to claim 8, wherein the timing relationship configuration information between the DL control channel and the DL data channel or the UL data channel for the DL control channel is configured based on a unit of a slot based on a numerology used for receiving the DL data channel, or based on a unit of a slot based on a numerology used for transmitting the UL data channel.

10. The user equipment according to claim 8, wherein the timing relationship configuration information between the DL data channel and the UL control channel for the DL data channel is configured based on a unit of a slot based on the numerology of the UL control channel.

11. The user equipment according to claim 8, wherein a carrier for receiving the DL control channel is different from a carrier for transmitting and receiving the UL signal or the DL data channel.

12. The user equipment according to claim 8, wherein the scheduling information is included in DL control information (DCI) received through the DL control channel.

* * * * *